(12) United States Patent
Martin et al.

(10) Patent No.: US 7,374,396 B2
(45) Date of Patent: May 20, 2008

(54) BOLT-ON RADIAL BLEED MANIFOLD

(75) Inventors: Nicholas Francis Martin, Simpsonville, SC (US); James Edward Cencula, Neenah, WI (US)

(73) Assignee: General Electric Company, Schenectady, NY (US)

( * ) Notice: Subject to any disclaimer, the term of this patent is extended or adjusted under 35 U.S.C. 154(b) by 502 days.

(21) Appl. No.: 11/066,167

(22) Filed: Feb. 28, 2005

(65) Prior Publication Data

US 2006/0193719 A1 Aug. 31, 2006

(51) Int. Cl.
*F01B 25/00* (2006.01)
(52) U.S. Cl. .................... 415/144; 415/214.1
(58) Field of Classification Search .......... 415/144, 415/214.1
See application file for complete search history.

(56) References Cited

U.S. PATENT DOCUMENTS

| | | | | |
|---|---|---|---|---|
| 2,636,665 A | * | 4/1953 | Lombard | 417/368 |
| 2,837,270 A | * | 6/1958 | Chapman | 415/17 |
| 3,365,124 A | * | 1/1968 | Burge et al. | 415/115 |
| 4,844,689 A | * | 7/1989 | Seed | 415/169.1 |
| 6,027,304 A | | 2/2000 | Arar et al. | |
| 6,438,941 B1 | | 8/2002 | Elliott et al. | |
| 6,585,482 B1 | | 7/2003 | Liotta et al. | |
| 6,783,324 B2 | | 8/2004 | Muny | |
| 7,090,462 B2 | * | 8/2006 | Martin et al. | 415/144 |

* cited by examiner

*Primary Examiner*—Igor Kershteyn
(74) *Attorney, Agent, or Firm*—Nixon & Vanderhye, PC

(57) ABSTRACT

A compressor radial bleed manifold and compressor case assembly includes a compressor case having one or more bleed flow exit passages therein; and a discrete bleed manifold mounted on the compressor case and having one or more inlet passages extending radially between a manifold plenum and the one or more exit passages in the mounting boss for bleeding compressor air into the manifold plenum.

19 Claims, 2 Drawing Sheets

BOLT-ON RADIAL BLEED MANIFOLD

BACKGROUND OF THE INVENTION

This invention relates to rotary machine technology and specifically, to a discrete compressor bleed manifold attachable to the associated compressor case.

Reducing radial clearance between rotating compressor blades and the compressor case in axial flow industrial gas turbines is essential for improved performance. Current industrial gas turbine compressor bleed manifolds are integral to the basic compressor case structure. In other words, the current industrial turbine case design philosophy integrates the bleed manifold with the compressor case. This arrangement is not conducive to reducing compressor clearance, however, because the single shell or case is required to carry the engine loads and to maintain a round, tight clearance flow path. Such manifolds typically include opposed manifold sections joined along axially extending, opposed vertical flanges by a plurality of transversely oriented bolts. These bolts are necessarily far removed in a radial direction from the flow path, particularly at the radially inner manifold inlet. The current compressor bleed manifold structure further increases the challenge to good case design by disrupting an otherwise smooth load path; creating unsupported case wall sections which lead to the so-called "diving board" effect; limiting extraction pipe locations and resultant loads into the case; and creating thermal response mismatches between the rotor and the case.

A commonly owned pending application Ser. No. 10/920,166 filed Aug. 18, 2004 entitled "Compressor Bleed Air Manifold for Blade Clearance Control" addresses similar problems with split bleed manifolds by circumferentially extending, vertical flanges.

BRIEF DESCRIPTION OF THE INVENTION

The present invention provides for improved compressor clearances with optimized case stiffness and thermal response management by mechanically isolating the compressor bleed manifold from the engine casing load path. This is achieved by providing a discrete, bolt-on radial bleed manifold for mounting on the exterior of the load-carrying, single wall compressor case. The bolt-on radial bleed manifold configuration in accordance with the exemplary embodiment is secured to the case by a circumferential pattern of bolts extending through annular horizontal flanges on either side of the manifold inlet, and into a raised annular boss on the case. The bolt-on manifold may also require radially outer annular vertical flanges, depending on the manufacturing process. In either instance, compressor bleed air flow will enter the bolt-on radial bleed manifold via radially oriented slots or holes in the case that may be tailored to provide the optimal aerodynamics for the bleed flow.

The bolt-on radial bleed manifold configuration eliminates the above-mentioned "diving board" effect, thus providing more positive clearance control between the rotor blade tips and the outer diameter flow path wall. The manifold bleed assembly of this invention also provides new design options for tailoring the case stiffness and the thermal response rate. The stiffness tuning features will permit tighter clearances due to reduced case out-of-roundness, improved gravity sag matching to the rotor and improved thermal response matching to the rotor for hot restarts.

The manifold in accordance with the invention can also be configured to best support the location of the extraction piping, thus permitting reduction of piping loads into the case structure. The radial bleed manifold may also be terminated at the horizontal split lines of the case, thus creating two 180° manifold sections. If a full hoop manifold is required, the bolt-on radial bleed manifold can be configured to "step over" the horizontal split line flanges. Alternatively, the manifold may be tailored to include a number of circumferential or arcuate sections or segments. These segments will be defined to meet the extraction pipe needs as well as the case stiffness and thermal response requirements.

The bolt-on radial bleed manifold also permits variations in the manifold cross-sectional shape, manifold radial height, inner and outer flange radial height and thickness, extraction port orientation and the like, depending on specific end use applications.

Accordingly, in one aspect, the present invention relates to a compressor radial bleed manifold and compressor case assembly comprising a compressor case having one or more bleed flow exit passages therein; and a discrete bleed manifold mounted on the compressor case and having one or more inlet passages extending radially between a manifold plenum and the one or more exit passages in the mounting boss for bleeding compressor air into the manifold plenum.

In another aspect, the present invention relates to a compressor radial bleed manifold and compressor case assembly comprising a compressor case provided with a circumferentially extending boss having one or more bleed flow exit passages therein; and a discrete bleed manifold secured to the boss and having one or more inlet passages extending radially between a manifold plenum and the one or more exit passages in the mounting boss for bleeding compressor air into the manifold plenum; wherein the manifold comprises a pair of split half portions joined along opposed circumferentially extending vertical flanges on radially outer parts of the manifold.

In still another aspect, the present invention relates to a compressor radial bleed manifold and compressor case assembly comprising a compressor case provided with an arcuate boss having one or more bleed flow exit passages therein; and a discrete bleed manifold secured to the arcuate boss and having one or more inlet passages extending radially between a manifold plenum and the one or more exit passages in the mounting boss for bleeding compressor air into the manifold plenum; wherein the manifold is formed with a horizontal flange at a radially inner end of the one or more inlet passages engaged with the arcuate boss, the one or more inlet passages extending through the flange; and wherein a pair of bolt circles are defined in the flange on opposite sides of the inlet passages.

The invention will now be described in detail in connection with the drawings identified below.

DETAILED DESCRIPTION OF THE INVENTION

Figure 1:
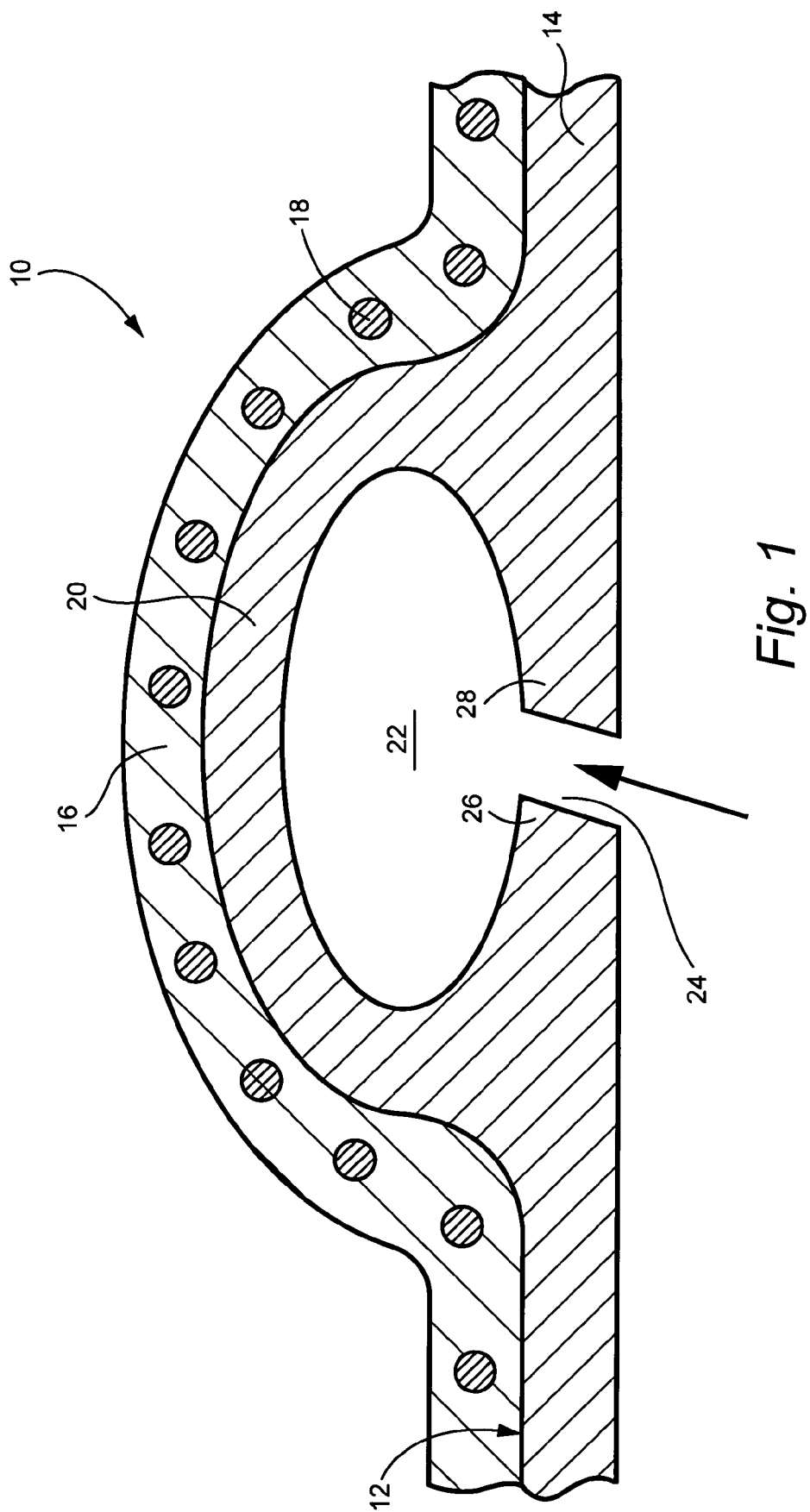
FIG. 1 is a simplified partial cross-section of a conventional bleed slot and manifold configuration.

FIG. 1 illustrates a conventional bleed slot and manifold configuration 10 for a compressor 12. The compressor case 14 is formed by two half sections, joined along a split vertical flange 16 by bolts 18 or the like. The manifold 20 is integral with the case wall and includes a plenum 22 and a continuous, annular inlet slot 24 connecting the plenum 22 with the interior flow path of the compressor 12. Note the unsupported marginal portions 26, 28 of the case 14 on either side of the slot 24. These unsupported case portions may deflect inwardly and/or outwardly, leading to what is commonly referred to as a "diving board" effect that negatively impacts on the ability to control tight flow path clearances between the compressor blades (not shown) and the case wall. Also note that the bolt hole pattern for bolts 18 adjacent the plenum 22 are spaced radially outwardly of the plenum and the inlet slot 24 which negatively impacts the stiffness of the case, particularly in the area of marginal portions 26, 28.

Figure 2:
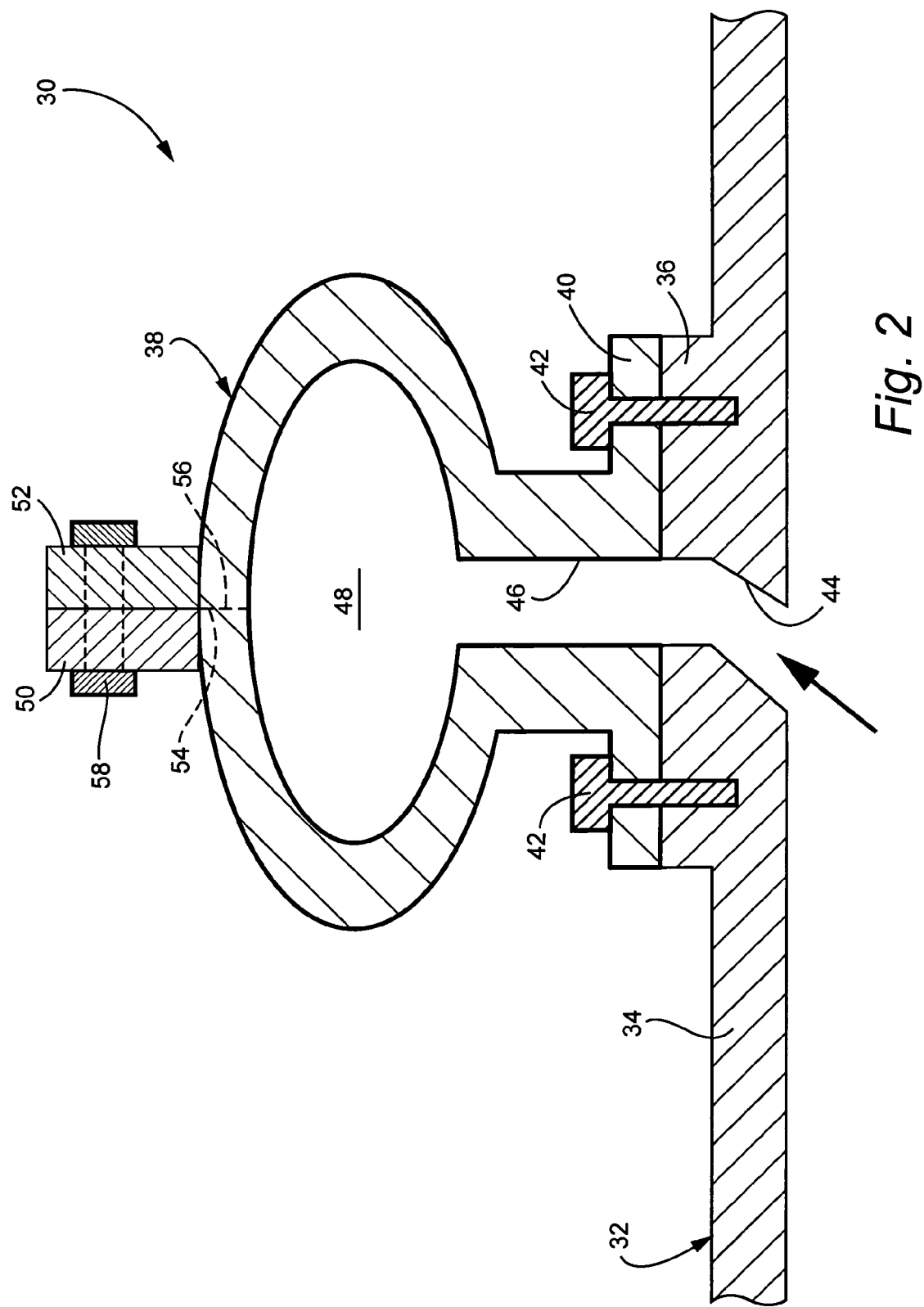
FIG. 2 is a simplified cross-section of a radial bleed manifold configuration in accordance with an exemplary embodiment of this invention.

An exemplary embodiment of this invention is shown in FIG. 2 where a new bleed manifold configuration 30 is provided for an associated compressor 32. The compressor 32 includes a case 34 with upper and lower portions separated by a horizontal split line (not shown). A circumferentially extending raised boss 36 supports a manifold 38 provided with a mounting flange 40 adapted to engage the boss 36, thereby enabling the manifold 38 to be secured to the case 34 via bolts 42 or other suitable fasteners. It will be understood that boss 36 will extend substantially 180° about the upper case portion and that a similar boss will be provided on the lower case portion.

Holes or slots 44 in the case or case wall 34 pass through the boss 36 and into a similarly sized and shaped inlet passage 46 in the manifold 38 that leads to a substantially oval-shaped primary manifold passage or plenum 48. Depending on how the manifold 38 is manufactured, opposed upper vertical flanges 50, 52 may be formed (or added) along the radially outer part of the manifold in the event the manifold itself is split along edges 54, 56 (shown in phantom). For example, this arrangement would be required if the inlet hole or slot 44 extended over the entire manifold segment. Bolts 58 or other suitable fasteners would be employed to secure the upper and opposed free ends 54, 56 of the split manifold. The arcuate extent of the manifold will be matched to the boss 36 such that, for split cases, the manifold would normally be split as well. In other words, the bolt-on manifold as shown in FIG. 2 also may be terminated at the casing horizontal split lines, creating two 180° manifold sections. If a full hoop manifold is required, then the bolt-on radial bleed manifold can be configured to "step over" the horizontal split-line flanges on the upper and lower case portions.

The above-described bleed manifold configuration effectively isolates the bleed manifold from the load-carrying, or backbone, single-walled compressor case structure. Design variables for the bleed slot and manifold configuration include:

(a) manifold cross-section;
(b) manifold radial height;
(c) inner and outer flange radial height and thickness; and
(d) extraction ports orientation.

Items (a), (b) and (c) may all be a function of circumferential location.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A compressor radial bleed manifold and compressor case assembly comprising:

a compressor case having one or more bleed flow exit passages therein; and a discrete bleed manifold mounted on said compressor case and having one or more inlet passages extending radially between a manifold plenum and said one or more exit passages in said compressor case for bleeding compressor air into said manifold plenum, wherein said bleed manifold is divided into a pair of arcuate segments, each spanning substantially 180°.

2. The assembly of claim 1 wherein said manifold is formed with a circumferentially extending mounting flange at a radially inner end of said one or more inlet passages engaged with a circumferentially extending boss on said compressor case, said one or more inlet passages extending through said flange.

3. The assembly of claim 1 wherein said arcuate segments are joined along opposed vertical flanges on radially outer parts of said bleed manifold.

4. The assembly of claim 2 wherein said said arcuate segments joined along opposed vertical flanges on radially outer parts of said bleed manifold.

5. The assembly of claim 1 wherein said plenum is substantially oval in cross-section.

6. The assembly of claim 1 wherein said one or more exit passages comprises a plurality of circumferentially spaced holes.

7. The assembly of claim 1 wherein said one or more exit passages comprises a plurality of circumferentially spaced arcuate slots.

8. The assembly of claim 2 wherein bolt holes are formed in said flange on opposite sides of said inlet passages.

9. A compressor radial bleed manifold and compressor case assembly comprising:

a compressor case provided with a circumferentially extending boss having one or more bleed flow exit passages therein; and a discrete bleed manifold secured to said boss and having one or more inlet passages extending radially between a manifold plenum and said one or more exit passages in said boss for bleeding compressor air into said manifold plenum; wherein said manifold comprises a pair of split half portions joined along opposed circumferentially extending vertical flanges on radially outer parts of said manifold.

10. The assembly of claim 9 wherein said manifold is formed with a horizontal flange at a radially inner end of said one or more inlet passages engaged with said boss, said one or more inlet passages extending through said flange.

11. The assembly of claim 9 wherein said plenum is substantially oval in cross-section.

12. The assembly of claim 9 wherein said one or more exit passages comprises a plurality of circumferentially spaced holes.

13. The assembly of claim 9 wherein said one or more exit passages comprises a plurality of circumferentially spaced arcuate slots.

14. The assembly of claim 10 wherein bolt holes are formed in said flange on opposite sides of said inlet passages.

15. A compressor radial bleed manifold and compressor case assembly comprising:
   a compressor case provided with an arcuate boss having one or more bleed flow exit passages therein; and
   a discrete bleed manifold secured to said arcuate boss and having one or more inlet passages extending radially between a manifold plenum and said one or more exit passages in said mounting boss for bleeding compressor air into said manifold plenum; wherein said manifold is formed with a horizontal flange at a radially inner end of said one or more inlet passages engaged with said arcuate boss, said one or more inlet passages extending through said flange; and wherein bolt holes are formed in said flange on opposite sides of said inlet passages.

16. The assembly of claim 15 wherein said manifold comprises a pair of split half portions joined along opposed vertical flanges on radially outer parts of said manifold.

17. The assembly of claim 15 wherein said plenum is substantially oval in cross-section.

18. The assembly of claim 15 wherein said one or more exit passages comprises a plurality of circumferentially spaced holes.

19. The assembly of claim 15 wherein said one or more exit passages comprises a plurality of circumferentially spaced arcuate slots.

* * * * *